(12) United States Patent
Scheck et al.

(10) Patent No.: US 7,051,860 B2
(45) Date of Patent: *May 30, 2006

(54) DISPLACEMENT DEVICE

(75) Inventors: Georg Scheck, Weitramsdorf (DE);
Peter Schumann, Unlersiemau (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 163 days.

This patent is subject to a terminal disclaimer.

(21) Appl. No.: 10/724,313

(22) Filed: Nov. 28, 2003

(65) Prior Publication Data
US 2004/0174061 A1 Sep. 9, 2004

Related U.S. Application Data

(63) Continuation of application No. 09/592,485, filed on Jun. 8, 2000, now abandoned.

(30) Foreign Application Priority Data
Jun. 8, 1999 (DE) .................... 199 26 994

(51) Int. Cl.
*B60N 2/02* (2006.01)
(52) U.S. Cl. ..................... 192/223; 297/374
(58) Field of Classification Search ................. 464/37; 192/223, 15, 19; 297/374
See application file for complete search history.

(56) References Cited

U.S. PATENT DOCUMENTS

| | | | | | |
|---|---|---|---|---|---|
| 1,858,066 | A | * | 5/1932 | Verderber | 192/15 |
| 2,307,475 | A | * | 1/1943 | Underhill | 192/223 |
| 3,051,282 | A | * | 8/1962 | Greene | 192/223 |
| 4,239,098 | A | * | 12/1980 | Jacoponi | 192/111 A |
| 4,533,027 | A | * | 8/1985 | Otani et al. | 297/374 |
| 5,908,101 | A | * | 6/1999 | Watanabe | 192/223 |
| 6,095,312 | A | * | 8/2000 | Schumann | 192/223.4 |
| 6,702,089 | B1 | * | 3/2004 | Scheck et al. | 192/223 |

FOREIGN PATENT DOCUMENTS

| | | | |
|---|---|---|---|
| DE | 34 15 692 A1 | * | 10/1985 |
| DE | 41 20 617 C2 | * | 12/1992 |
| DE | 198 07 790 A1 | * | 9/1999 |
| EP | 0 751 030 A1 | * | 1/1997 |
| EP | 0 908 349 A2 | * | 4/1999 |

\* cited by examiner

*Primary Examiner*—Rodney H. Bonck
(74) *Attorney, Agent, or Firm*—Christie, Parker & Hale, LLP

(57) ABSTRACT

A displacement device for producing a rotational movement with an output element adjustable in angle by operating a drive element. A load torque lock mounted between the drive element and the output element blocks, with force locking connection, torque introduced on the output side and transfers torque introduced on the drive side to the output element. Between the drive element and the load torque lock and/or between the output element and the load torque lock is a play compensating device which compensates the torsion angle play between the drive element, the output element and the load torque lock. The displacement device is used in particular for window lifters or seat adjusters of vehicles.

6 Claims, 14 Drawing Sheets

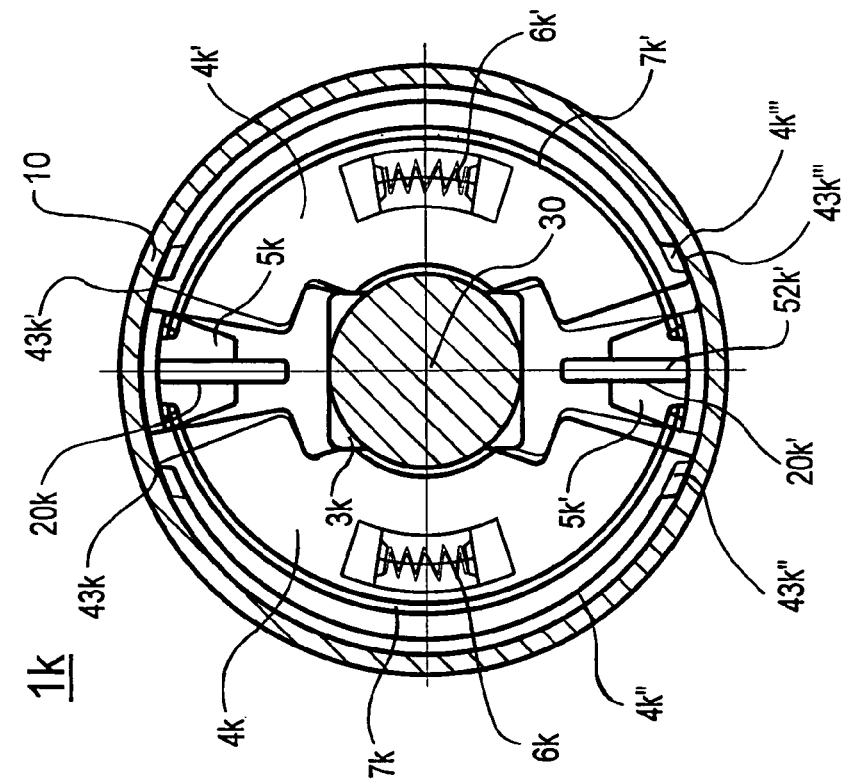
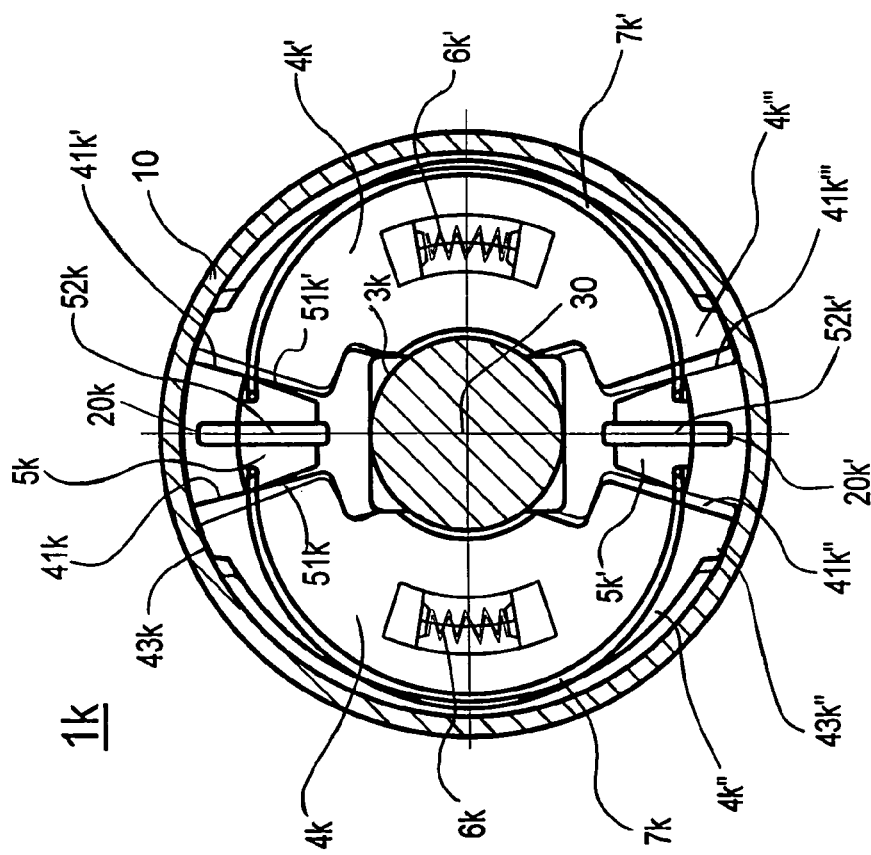

DISPLACEMENT DEVICE

CROSS-REFERENCE

This application claims priority of German Application No. 199 26 994.7 filed Jun. 8, 1999. This application is also a continuation of patent application Ser. No. 09/592,485, filed Jun. 8, 2000, now abandoned the disclosure of which is incorporated fully herein by reference.

BACKGROUND OF THE INVENTION

The invention relates to a displacement device.

From DE 41 20 617 C2 a displacement device is known which has a load torque lock with which torque on the drive side is transferred in both directions to an output element while torque on the output side is blocked in both directions by the load torque lock and the force is introduced into a displacement housing and is consequently not transferred to the drive element.

Between the drive element and the load torque lock the torque on the drive side is transferred by means of elements which engage in each other with keyed engagement. Since the position of the locking elements of the load torque lock changes through tolerances and wear as a result of high flat surface pressures, in order to reach the required functional reliability of the known displacement device it is necessary to incorporate a large play so that during functioning a torsion angle play is present between the interengaging elements without which a stepped transfer or change of direction of the torques on the drive side is not possible. A minimum torsion angle play must also therefore be present between the interengaging elements of the drive element and the load torque lock in order to guard against wear and enable a certain elastic deformation.

Opposite this however too much torsion angle play, particularly in the case of a stepped transfer of the torque on the drive side, has a noticeable detrimental effect since the torsion angle play causes a correspondingly large idling path or idling stroke of the drive element. Furthermore too much torsion angle play can lead, when reversing the movement, to a detrimental reversal play and to inaccurate handling.

The known displacement device has a relatively large reversal play in the brake unit conditioned by the tolerances of the structural parts. In order to restrict this, manufacture must be carried out precisely within a narrow tolerance band. The assembly of the individual component parts which are provided with small tolerances is therefore expensive since the component parts which are to be connected together have to be positioned very precisely relative to each other.

SUMMARY OF THE INVENTION

The object of the present invention is therefore to provide a displacement device with optimum torsion angle play between a drive element, an output element and a load torque block which on the one hand is restricted to a minimum and on the other ensures a reliable force and torque transfer and which during assembly requires no adjustment and even after long term use requires no adjustment of the torsion angle play.

According to the invention a play compensating device which balances the torsion angle play between the drive element, output element and the load torque block, is mounted between the drive element and the load torque block or between the output element and the load torque block so that the functionally-conditioned torsion angle play between the drive element and the load torque lock or between the load torque lock and the output element is set and adjusted automatically. An automatic setting of the optimum torsion angle play thereby takes place taking into account the tolerances of the component parts and the adjustment is carried out taking into account the wear on the component parts so that a minimum idling stroke is ensured during operation and a high functional reliability of the displacement device is ensured taking into account the unavoidable wear. The manufacture of the individual component parts is thus considerably more economical, assembly of the displacement device is simplified and rejects are restricted to a minimum.

The load torque lock preferably has at least two locking elements mounted in a cylindrical displacement housing, with the clamping faces of the locking elements acting with predetermined pretension on the displacement housing under the action of the play compensating device which is mounted at least in part between opposing expanding faces of the locking elements and presses these locking elements apart from each other. Torque introduced on the output side thereby increases the bearing force of the clamping faces and thus of the locking elements against the displacement housing.

The play compensating device can be guided in the drive element and can be connected to a spring which pretensions the play compensating device in the play compensating direction while the locking elements are loaded with pretensioning force against the play compensating direction.

The play compensating device can be formed in different ways in order to ensure the locking elements bear on the displacement housing with the predetermined pretensioning force and in order to guarantee an automatic adjustment which becomes necessary as the component parts wear down. In a first embodiment the play compensating device consists of at least one wedge mounted between the expanding faces of the locking elements, where the wedge faces oppose the expanding faces of the locking elements and where the wedge is guided displaceable with a wedge guide in keyed connection in a slide guide of the drive element and is pretensioned radially by means of a spring so that the wedge faces adjoin the expanding faces free of play.

In order to ensure that the wedge on the one hand in the absence of any drive torque engenders the optimum setting and adjustment and does not hinder the movement of the locking elements, but on the other hand in the event of torque on the drive side is not radially displaced by the locking elements, and in order to keep the system able to function in the widest possible range, the material matching of the expanding faces and of the wedge faces on the one hand and of the active faces of the wedge guide and the slide guide of the drive element on the other hand is predetermined so that with the absence of drive torque the expanding faces can move the wedge against the action of the spring, but in the event of load on the drive side the wedge is held in its position. This is caused for example by a small friction value between the wedge faces and the expanding faces as well as by a high friction value between the guide face of the wedge and the slide guide of the drive element.

As an alternative or in addition the displacement device or the play compensating device can be geometrically designed so that the wedge angle α which the wedge faces include between themselves, the minimum friction angle $\sigma_{sperr,min}$ in the event of load on the drive side and the maximum friction angle $\sigma_{sperr,max}$ in the event of load on the output side between the wedge faces and the expanding faces as well as the minimum friction angle $\sigma_{antr, min}$ between the wedge guide and the slide guide meets the conditions $$2*\sigma_{sperr, max} < \alpha$$

$$\sigma_{antr, min} + \sigma_{sperr, min} > \alpha/2$$

in which $\sigma$=arc tan $\mu$ and $\mu$ is the friction value between the friction faces formed from the surface pairings wedge surface/expanding surface and wedge guide/slide guide.

In order to intensify the clamping action of the wedge the wedge guide can be arranged radially off-set from the expanding faces of the locking elements. A reduction of the (radial) height of the wedge also leads to an intensification of the clamping action so that when necessary the wedge angle can also be selected as obtuse.

In order to produce a defined spot or linear contact between the wedge and the expanding faces of the locking elements, the expanding faces of the locking elements or the wedge faces are formed ball-shaped so that the slide action is minimal as a result of the slight friction of the surfaces which slide on each other and thus easy adjustment is guaranteed.

In a second embodiment the play compensating device consists of at least one cylindrical roller or ball mounted between the expanding faces of the locking elements, wherein the roller or ball guide is mounted in a slide guide of the drive element and its outer face adjoins with linear or spot contact against the flat or ball-shaped expanding faces of the locking elements free of play.

In a third embodiment the play compensating device consists of at least one eccentric mounted rotatable between the expanding faces of the locking elements and preferably formed as a stepped bolt, with an eccentric stud mounted in a bore of the drive element and is radially pretensioned by a torsion spring so that the eccentric faces adjoin the expanding faces of the locking elements free of play.

Through the shaping and/or surface conditions the eccentric faces adjoin the expanding faces of the locking elements and the eccentric stud is connected to the drive element so that when the drive element is actuated the eccentric is blocked and does not obstruct the movement of the locking elements.

An automatic compensation of the optimum torsion angle play can be provided with different structural forms of the displacement device or drive element, output element and the load torque lock. These embodiments comprise inter alia the arrangement of pairs of locking elements in two superposed planes, applying a pretensioning force to the play compensating device by means of compression, yoke or formed springs, with or without additional force transfer elements, such as shears and the like and the positive-locking torque transfer from the drive element to the output element when the locking action is lifted through the load torque lock.

BRIEF DESCRIPTION OF THE DRAWINGS

Further advantages are produced from the following described embodiments in which:

FIGS. 13 and 14 show a load torque lock with wedges connected by springs and adjoining the end faces of the locking elements in the case of different play;

The diagrammatic illustrations of the load torque locks in FIGS. 1 to 7 serve only to explain the functioning principle of play compensation for displacement devices. FIGS. 8 to 18 show various different embodiments for concrete designs of displacement devices and play compensating devices used therein. The reference numerals used in the function illustrations of FIGS. 1 to 7 as well as the reference numerals used to designate the individual parts of the displacement devices in the concrete embodiments of FIGS. 8 to 18 coincide where they relate to the same or similar functioning component parts. The alphabetical additions to the reference numerals similarly designate the same or similar type of functioning elements of the various embodiments.

DETAILED DESCRIPTION OF THE INVENTION

Figure 1:
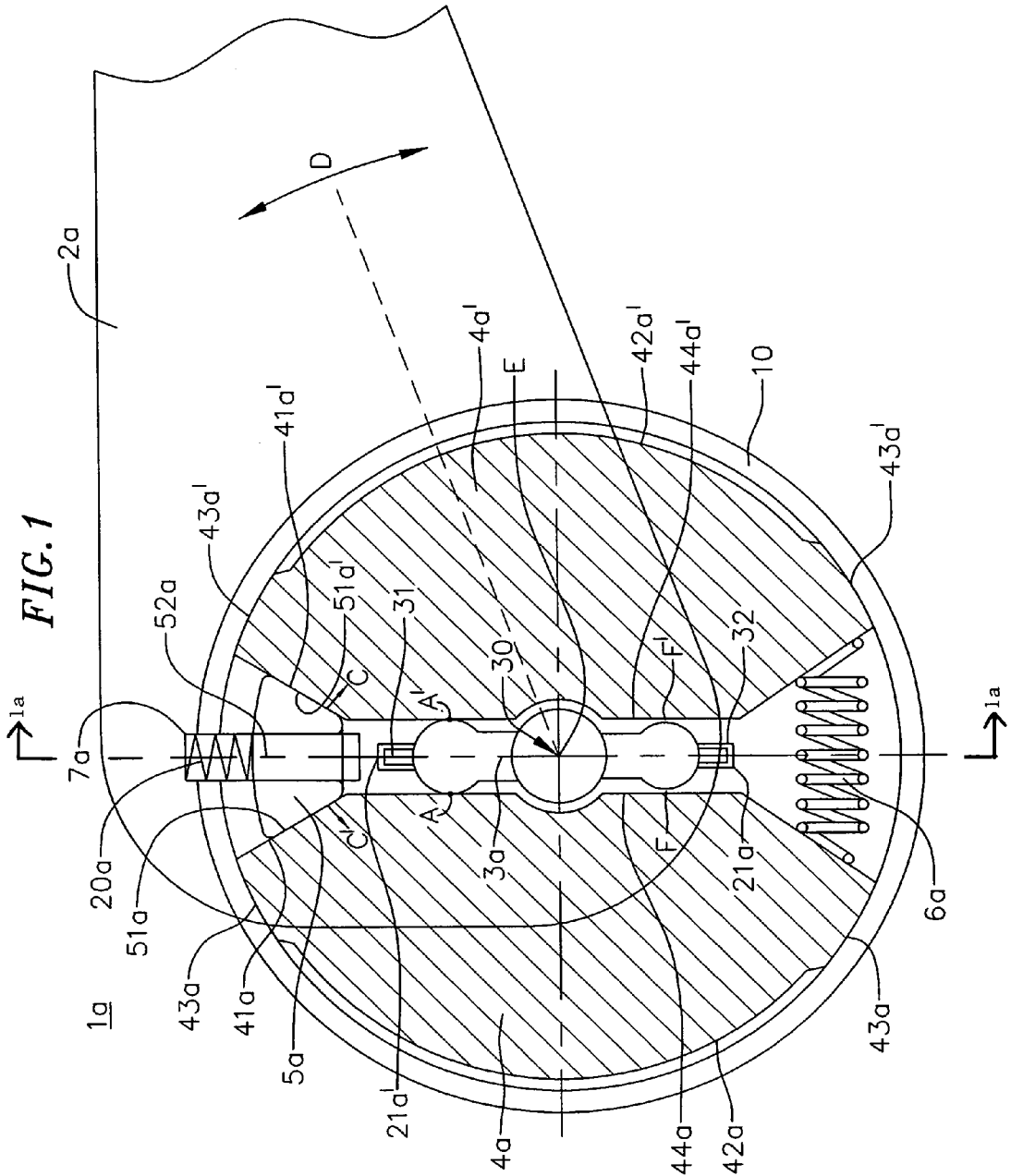
FIGS. 1 to 7 which consists of FIGS. 2a–2c, FIGS. 3a–3b, and FIGS. 7a–7b show diagrammatic illustrations for explaining the functioning principle of different play compensating devices for displacement devices with a load torque lock.

FIG. 1 shows a front sectional view through a double-sided acting displacement device 1a with a displacement housing 10 in which the functional parts of a load torque lock are mounted with automatic play compensation. FIG. 1a shows a side sectional view. A drive element formed as a drive lever 2a is mounted rotatable about an output axle 30. The output axle 30 includes an axis E about which the drive lever rotates in direction D. The output axle 30 is connected to an output element 3a. Between the drive element 2a and the output element 3a there are locking elements 4a and 4a' formed as segments and adjoining the cylindrical inner face of the displacement housing 10 with a part of their peripheral faces 42a, 42a' which are formed as locking faces 43a and 43a'.

The opposing expanding faces 41a, 41a' of the locking elements 4a and 4a' are adjoined by wedge faces 51a and 51a' of a wedge 5a which causes an automatic play compensation. The wedge 5a is mounted with a wedge guide 52a in a recess 20a of the drive lever 2a formed as a wedge slide guide and is pretensioned by means of a spring 7a so that the wedge faces 51a, 51a' press in a play compensating direction c, c' circular against the expanding faces 41a, 41a' of the locking elements 4a, 4a' and thus bring the locking faces 43a, 43a' of the locking elements 4a, 4a' to bear against the cylindrical inner face of the displacement housing 10.

The locking elements 4a, 4a' are pretensioned by a locking element spring 6a, circular against the play compensating direction c, c' so that the expanding faces 41a, 41a' endeavour to press the wedge 5a out from the interspace between the expanding faces 41a and 41a'. As explained in further detail below from the enlarged detailed illustration of the play compensating device according to FIGS. 2a to 2c the friction conditions between the expanding faces 41a, 41a' and the wedge faces 51a, 51a' on the one hand and the wedge guide 52a and the wedge slide guide 20a on the other hand are produced so that when torque is applied on the drive side of the wedge 5a by the drive lever 2a, the locking elements 4a, 4a' are entrained free of play by the wedge 5a to move in a driving direction. In the rest state, due to the friction conditions, the locking elements 4a and 4a' are free to move for play compensation, i.e. the locking element 4a, 4a are pressed through the wedge 5a under the action of the spring 7a with their locking faces 43a, 43a' against the displacement housing 10.

This function conditions a small friction value at the friction face formed between the wedge faces 51a, 51a' and the expanding faces 41a, 41a' and a large friction value at the friction face formed between the wedge guide 52a and the wedge slide guide 20a so that under certain geometric conditions the wedge 5a is prevented from being pressed out from the interspace between the expanding faces 41a, 41a'.

When torque is introduced on the drive-side through the drive lever 2a the torque is transferred through the wedge 5a to the expanding faces 41a or 41a' of the locking elements 4a or 4a' depending on the direction of rotation and the locking elements 4a or 4a' are entrained in the circumferential direction since the bearing contact of the locking faces 43a, 43a' of the locking elements 4a, 4a' against the cylindrical inner face of the displacement housing 10 is not sufficient to block the torque which is introduced. Gaps F, F' are provided between lower portions of the locking elements 4a, 4a' and the output element 3a. After the locking element 4a, 4a' has been moved slightly in the circumferential direction through the torque introduced on the drive side, claw slide guides 21a and 21a' of the drive lever 2a come into positive-locking engagement with claws 31, 32 on the output side and entrain the output element 3a in keyed engagement into the relevant rotary direction of the drive lever 2a. A keyed connection between the drive element 2a and output element 3a of this kind which is activated after a slight rotation has been introduced and transfers the further transfer of the torque exerted by the drive element 2a to the output element 3a, is however not absolutely necessary since the transfer of the torque from the drive element 2a to the output element 3a can also take place through the wedge 5a of the play compensating device and through the locking elements 4a, 4a' to the output element 3a. The half of the inner face 44a, 44a' of the locking element that extends in the direction of the spring 6a closes the gap F, F' and abuts against the output element 3a to transmit the drive torque.

With the introduction of torque on the output side depending on the direction of rotation the outer face of the output element 3a is loaded more heavily at points A or A' and presses the inner locking element faces 44a, 44a' radially apart so that the locking faces 43a or 43a' intensify their bearing contact against the cylindrical inner face of the displacement housing 10 and thus block the torque introduced on the output side.

Figure 2A:
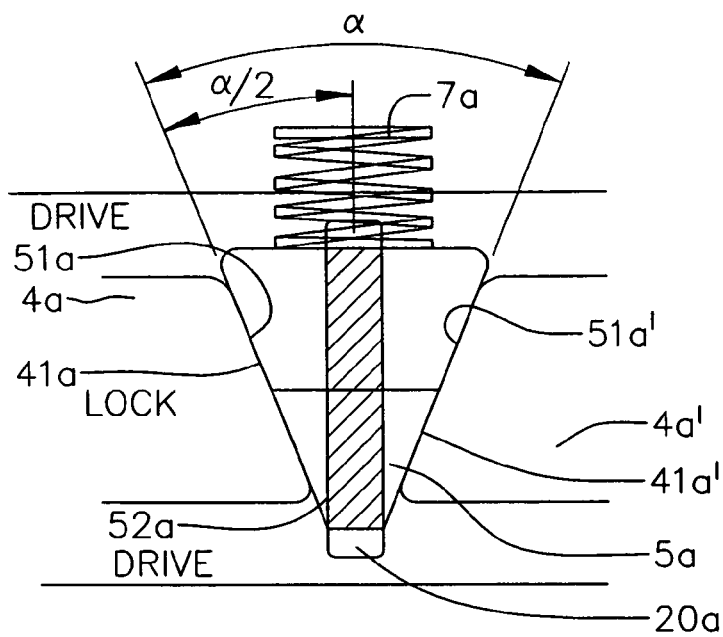

FIG. 2a shows in an enlarged detailed illustration of FIG. 1 a play compensating device with a wedge 5a as the play compensating element and a section of the drive lever 2a with wedge slide guide 20a provided therein as a recess, The wedge guide 52a of the wedge 5a is mounted in the recess and adjoins with keyed engagement against the side walls of the wedge slide guide 20a of the drive lever 2a. The wedge guide 52a runs perpendicular to the drive direction, but is displaceable perpendicular to the drive direction inside the wedge slide guide 20a.

The wedge faces 51a and 51a' of the wedge 5a are adjoined by the expanding faces 41a and 41a' of the locking elements 4a, 4a'. In order to actuate the locking elements 4a, 4a' connected in force-locking engagement with the output element 3a the wedge 5a is guided in the drive element 2a with the wedge guide 52a and biased with a compression spring 7a so that the wedge faces 51a and 51a' adjoin free of play the expanding faces 41a, 41a' of the locking elements 4a, 4a' without being pressed apart against a spring which may be present (for example the locking element spring 6a according to FIG. 1) or the locking elements 4a, 4a' lifting off from the cylindrical inner wall of the displacement housing 10.

Figure 2B:
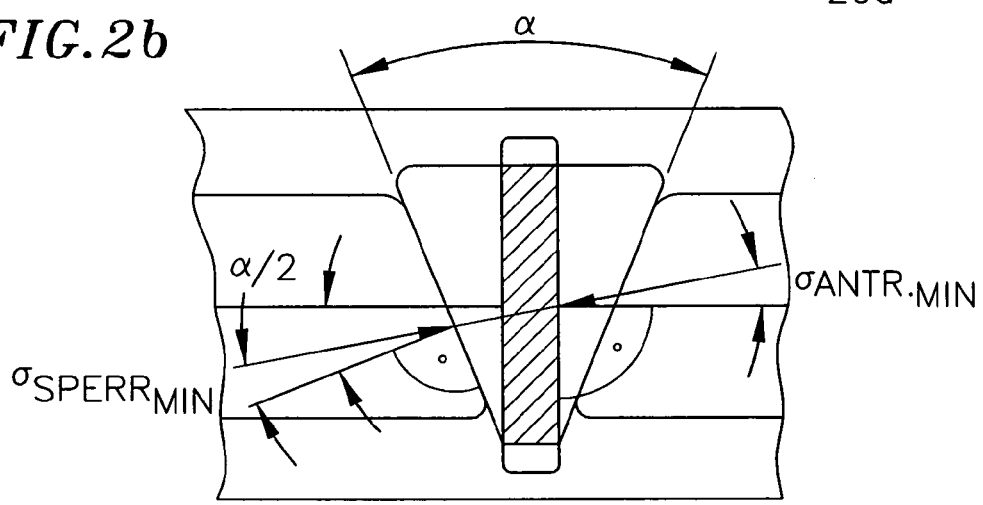

FIG. 2b shows the force and friction conditions in the event of load on the drive side, i.e. with the action of the drive element 2a on the wedge 5a. In the event of entrainment of the wedge 5a through the drive element 2a against a side of the locking element 4a or 4a', α/2 acts as the wedge angle. In the event of a force equilibrium, i.e. in the blocking state $$\sigma_{antr} + \sigma_{sperr} = \alpha/2. \tag{1}$$

In order to ensure a secure hold, the sum of the friction values when the wedge 5a slips through must however be larger than the wedge angle α/2 so that in the event of load on the drive side the following applies $$\sigma_{antr,\,min} + \sigma_{sperr,\,min} > \alpha/2. \tag{2}$$

in which $\sigma_{sperr,min}$ is the minimum friction angle and $\sigma_{sperr,max}$ is the maximum friction angle between the wedge faces 51a and the expanding faces 41a, $\sigma_{antr,min}$ the minimum friction angle between the wedge guide 52a and the wedge slide guide 20a, σ=arc tan μ and μ is the friction value between the friction faces formed from the surface pairings wedge face/expanding face and the wedge guide/slide guide.

Figure 2C:
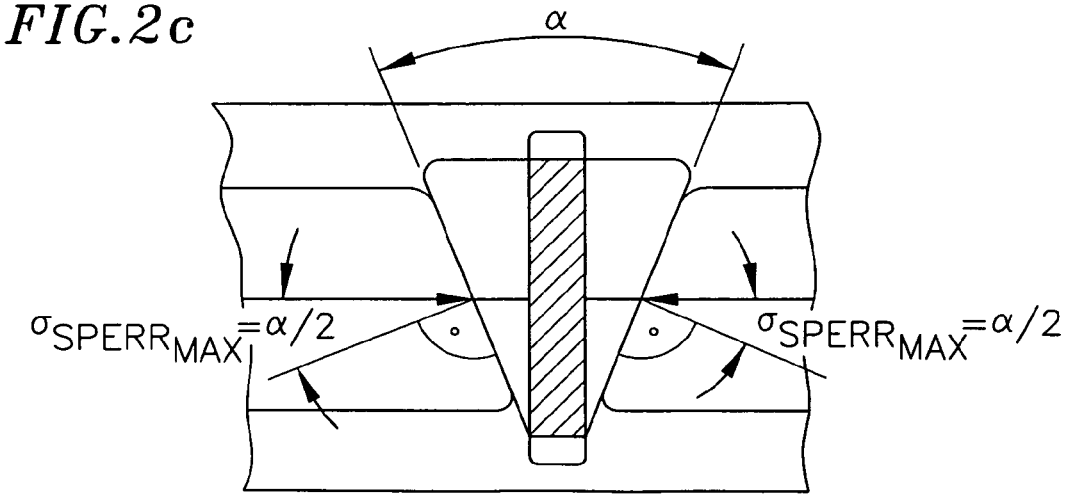

FIG. 2c shows the forces and friction angle in the event of load on the output side, i.e. in the event of load on the side of the locking elements 4a or 4a'. In this case of load on the wedge 5a free of drive torque from the sides of the locking element 4a or 4a', the sum of the limit friction values must be $$2*\sigma_{sperr,\,max} < \alpha \tag{3}$$

so that the wedge 5a does not impede the movement of the locking elements 4a, 4a'. If this condition is fulfilled the wedge 5a slips through without any drive torque as a result of force exerted by the locking elements 4a, 4a', while it is blocked in the event of force exerted by the drive element 2a on the locking elements 4a, 4a'.

So that the system functions in the largest possible range of $\sigma_{sperr}$ it is advantageous to make $\sigma_{antr,min}$ as large as possible, e.g. by providing corresponding roughness or mini-serrations.

Figure 3A:
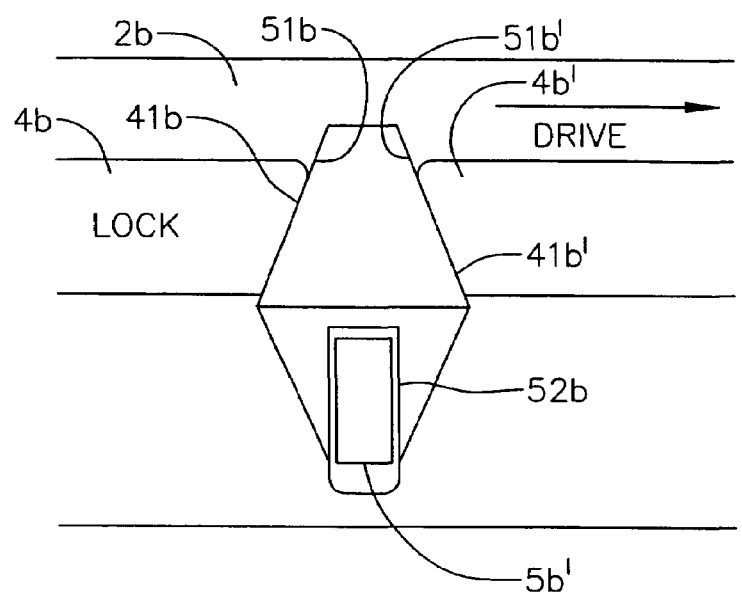
Figure 3B:
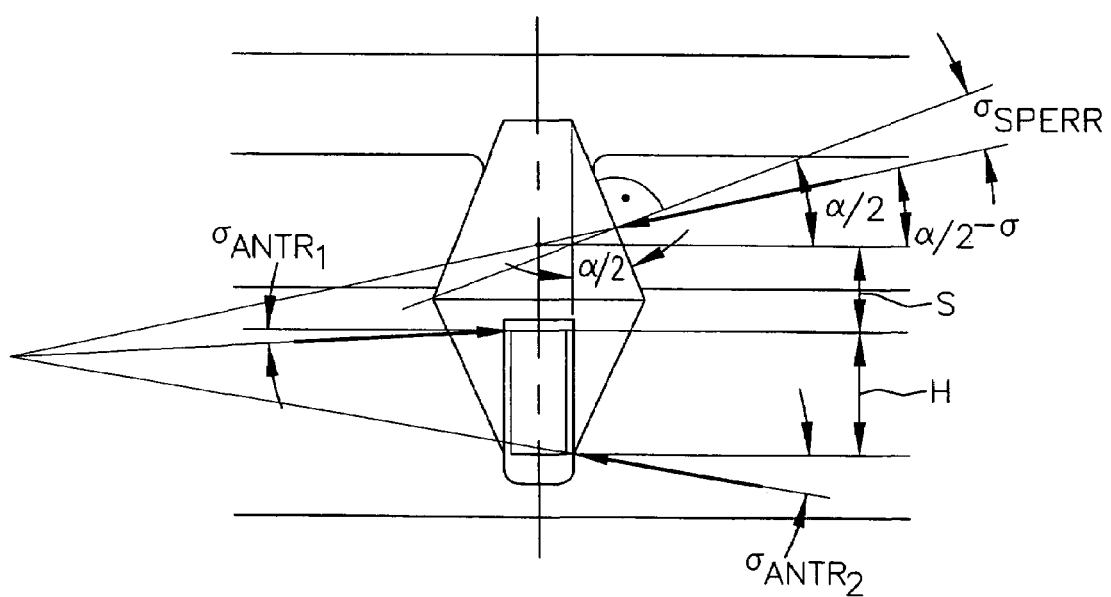

FIGS. 3a and 3b show a possibility of intensifying the self-locking effect of a wedge 5b to guard against the wedge 5b being pressed out through the action of the expanding faces 41b, 41b' of the locking elements 4b, 4b' on the wedge 5b by providing a contact bearing for the wedge 5b at two points through canting. This is achieved through an eccentric arrangement of the wedge guide 52b in relation to the expanding faces 41b, 41b' of the locking elements 4b, 4b' wherein the height H of the wedge guide 52b and the distance s of the upper edge of the wedge guide 52b from the contact point of the expanding faces 41b, 41b' is variable.

With a decrease in the height H or through an increase in the distance s the canting effect is intensified so that the wedge angle α of the wedge 5a can become more obtuse. In the event that the distance s is equal to zero then the arrangement exists according to the method of operation of FIG. 2. With an increasing distance s through the off-set wedge guide an intensifying canting effect is produced which increases the contact bearing force and hinders the system from slipping through in the event of drive load with significantly smaller friction angles. With a predetermined wedge angle α the minimum height H of the wedge guide 52b and thus a minimum distance s of the centre of the wedge guide 52b from the centre of the expanding faces 41b, 41b' of the locking elements 4b, 4b' must be provided in order to guarantee the functioning of the play compensating device.

Figure 4:
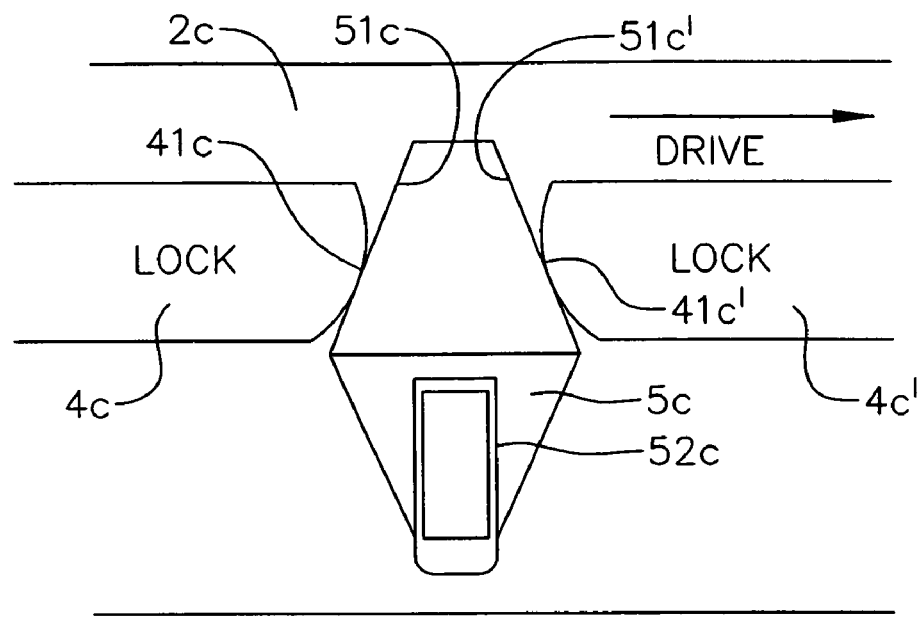

FIG. 4 shows a ball-shaped design of the expanding faces 41c, 41c' of the locking elements 4c, 4c' wherein the wedge faces 51c, 51c' fix the angle for the geometric conditions described above. As an alternative the wedge faces 51c and 51c' can be made ball-shaped and the expanding faces 41c, 41c' of the locking elements 4c, 4c' can be flat.

Figure 5:
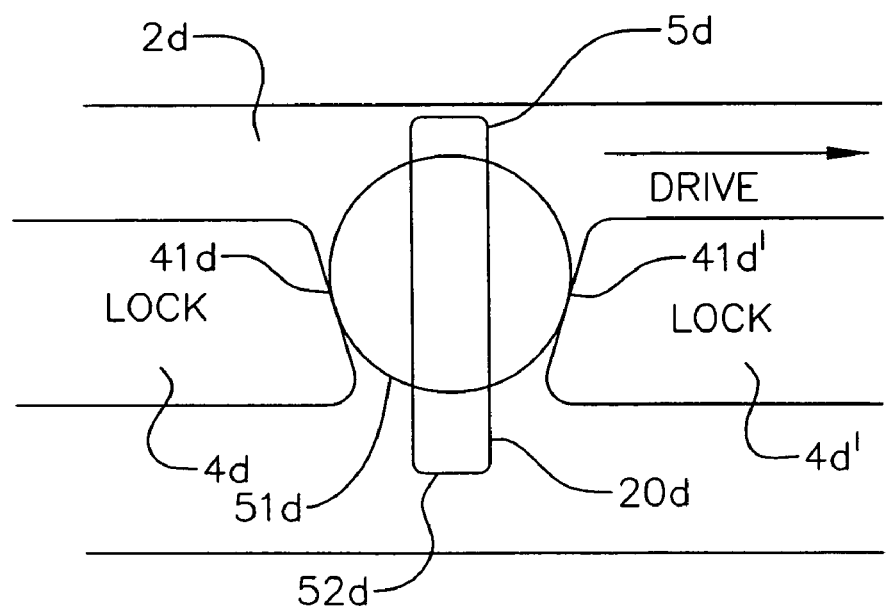

FIG. 5 shows a function diagram in which instead of a wedge as with the displacement device described above, a cylinder or a ball is provided as the play compensating element 5d and is guided analogous with the embodiments described above with a guide 52d in a slide guide 20d of the drive element 2d. The play compensating element 5d lies with its cylinder or ball surface 51d against the expanding faces 41d, 41d' of the locking elements 4d, 4d'.

Figure 6:
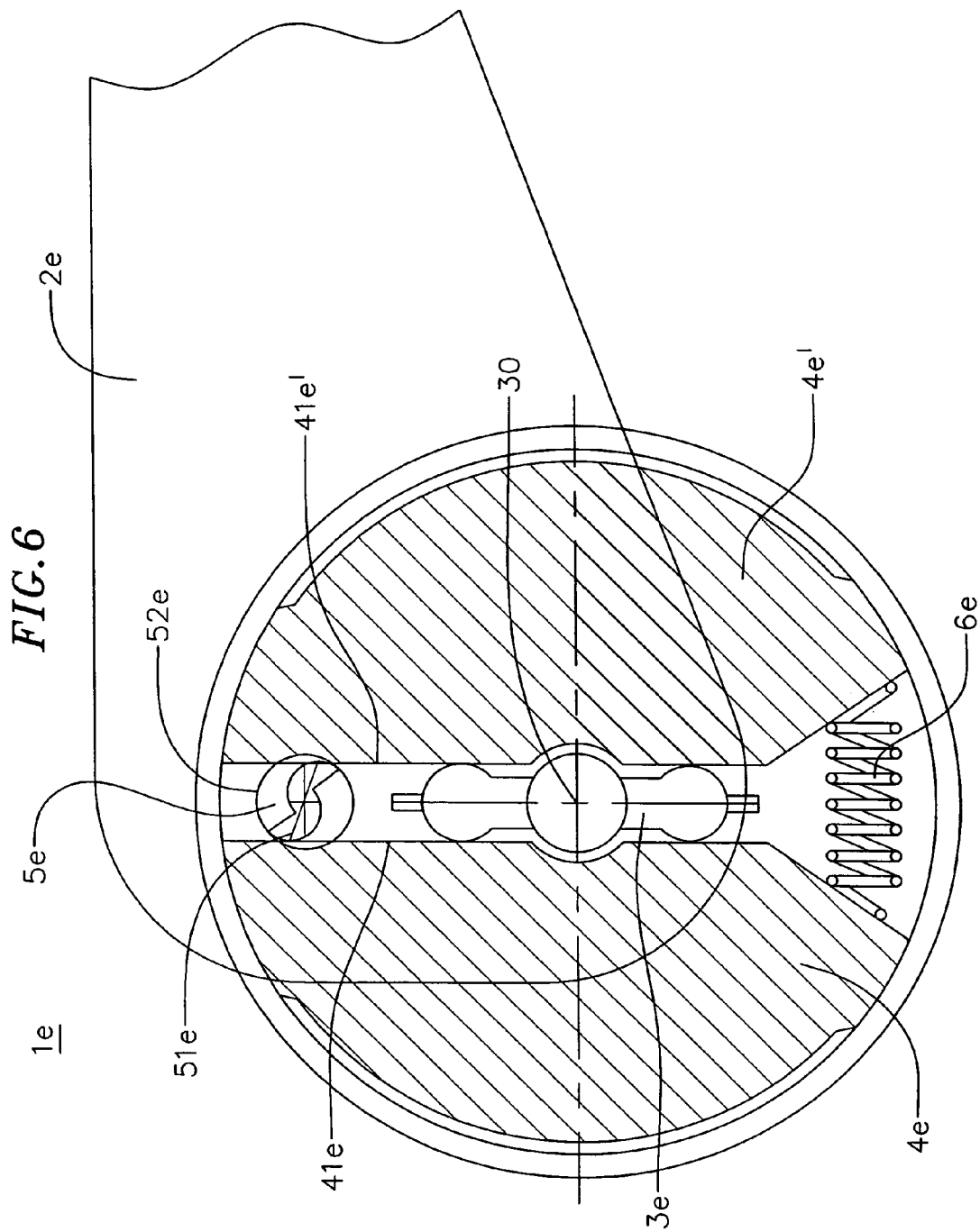

FIG. 6 shows a displacement device 1e which corresponds to the displacement device 1a according to FIG. 1. As opposed to the displacement device 1a according to FIG. 1 here however a play compensating device is provided in the form of an eccentric 5e which is designed as a stepped bolt pretensioned with a torsion spring and mounted with a guide pin 52e in a bore 20e of the drive element formed as a drive lever 2e, the eccentric adjoining by its eccentric faces 51e the expanding faces 41e and 41e' of the locking elements 4e, 4e'.

Figure 7A:
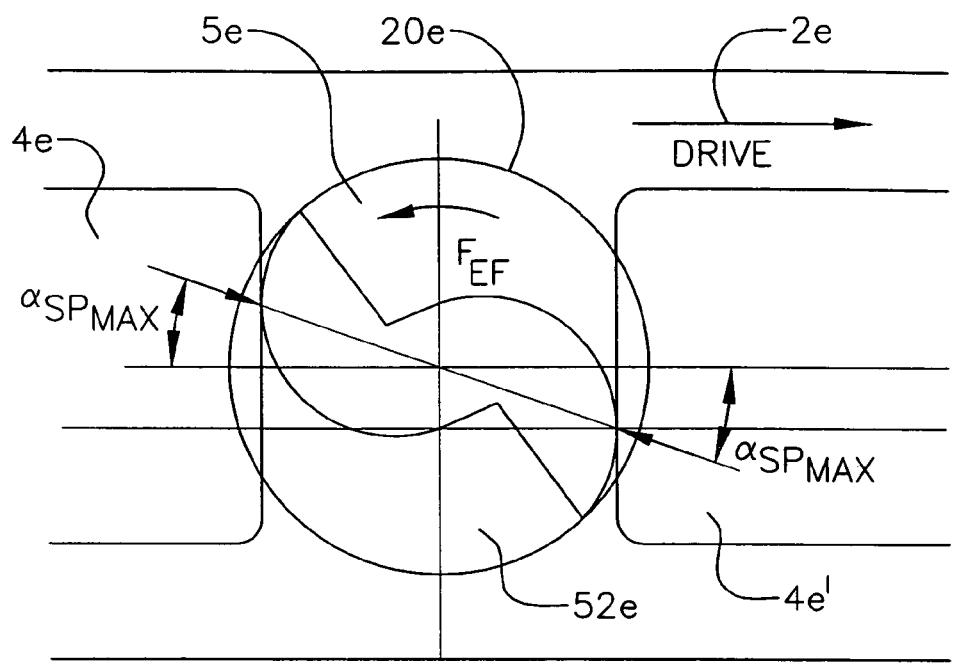
Figure 7B:
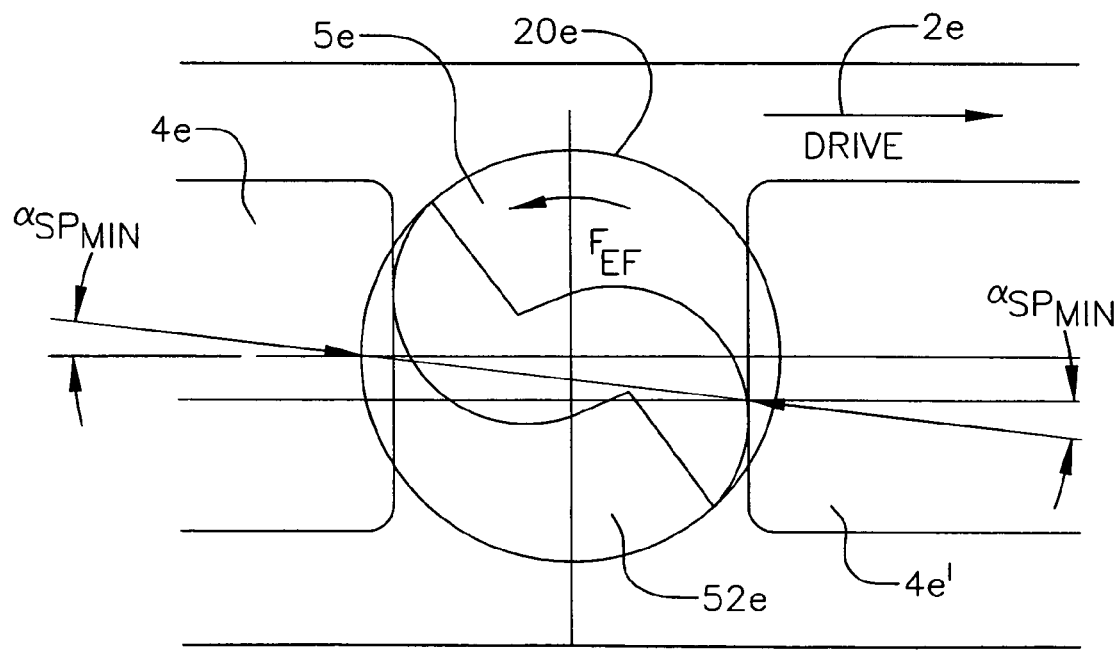

FIGS. 7a and 7b show on an enlarged scale details of the play compensating device according to FIG. 6 and the geometric conditions which are essential for the functioning of the play compensating device in the event of load on the output side (FIG. 7a) on the part of the locking elements and in the event of load on the drive side (FIG. 7b) on the part of the drive element 2e. The spring tensioning of the eccentric 5e is entered in the direction of the arrow $F_{EF}$.

The contact and friction conditions of the play compensating device shown in FIGS. 6, 7a and 7b are designed so that the eccentric 5e is blocked when the drive element 2e is actuated but does not obstruct the movement of the locking elements 4e and 4e' which is necessary for a satisfactory locking of torque introduced on the output side, even when taking into account wear on the component parts.

According to FIG. 7a the contact bearing points between the eccentric 5e and the locking elements 4e, 4e' are designed so that in the event of load through the locking elements 4e and 4e' a relatively large angle $\alpha_{sp\ max}$ is produced between the force direction of the contact points and the horizontal which is greater than the maximum friction angle so that in the event of load on the output side the eccentric 5e can be turned back by the locking elements 4e, 4e' against the pretensioning force $F_{EF}$ of the eccentric 5e.

With the conditions illustrated in FIG. 7b, on the other hand, in the event of load on the drive side a minimum friction angle $\alpha_{sp\ min}$ is produced between the expanding faces 41e and 41e' of the locking element 4e, 4e' and the eccentric 5e which prevents the eccentric 5e from turning back and thus ensures a direct and play-free force transfer. The friction area between $\alpha_{sp\ min}$ and $\alpha_{sp\ max}$ is the friction area in which the friction values of the surface bearing between the eccentric and the locking elements have to lie for a functioning of the system. The force engagement point between the drive element and the bearing of the eccentric is produced from the force direction of $\alpha_{sp\ min}$. The friction value between these faces must thereby be such that the slip through friction angle σ=arc tan μ is greater than the angle $\alpha_{antr\ min}$ between this force direction and the normal to the circle, i.e. the bearing of the eccentric in the drive must be made consciously rough.

In other words: If the locking elements 4e, 4e' are compressed together then the eccentric 5e has to turn away, from which a maximum angle $\alpha_{sp\ max}$ results. All the friction angles must therefore be smaller than asp max so that the eccentric 5e can slip away.

FIGS. 8 to 19 illustrate various different variations of the load torque locks for displacement devices in which the functionally conditioned torsion angle play between the drive element and load torque lock is automatically set and adjusted.

Figure 16:
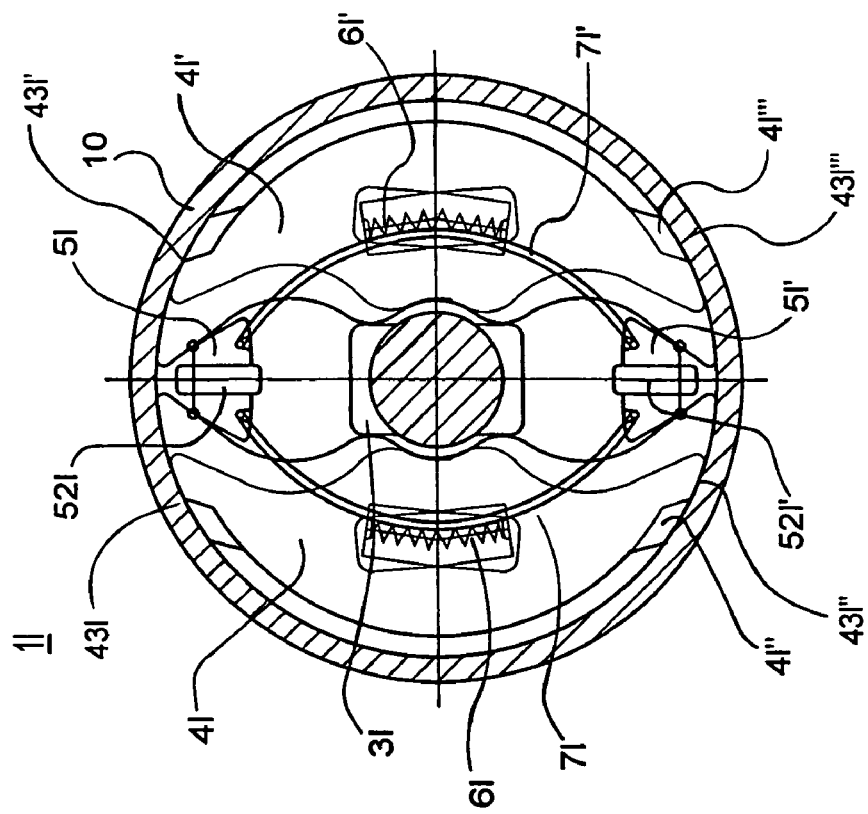
FIGS. 15 and 16 show a load torque lock with wedges connected by springs and enclosed by the locking elements with different play.
Figure 17:
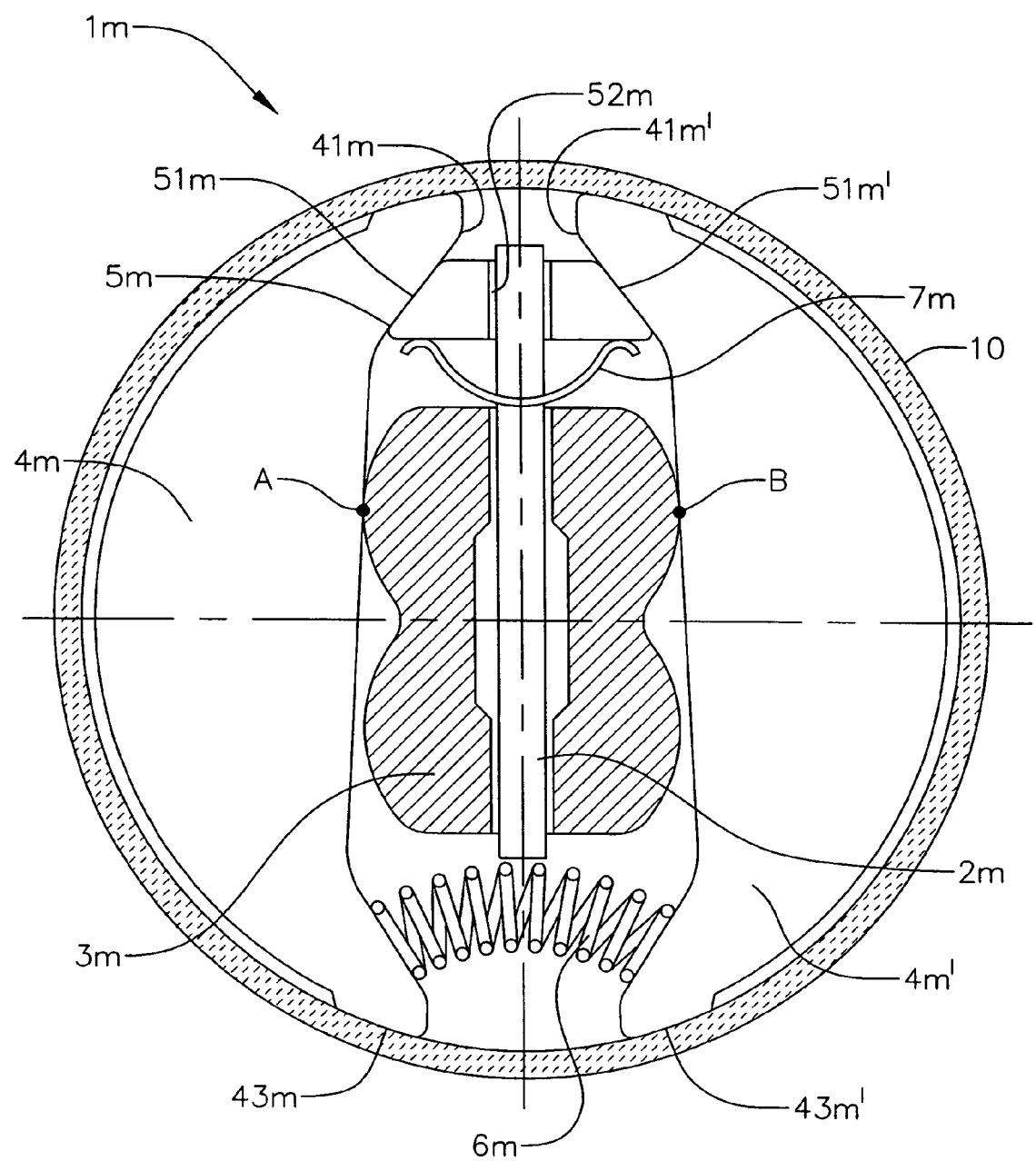
FIG. 17 shows a load torque lock with rod-like drive element guided through the output element and the wedge of a play compensating device.
Figure 18:
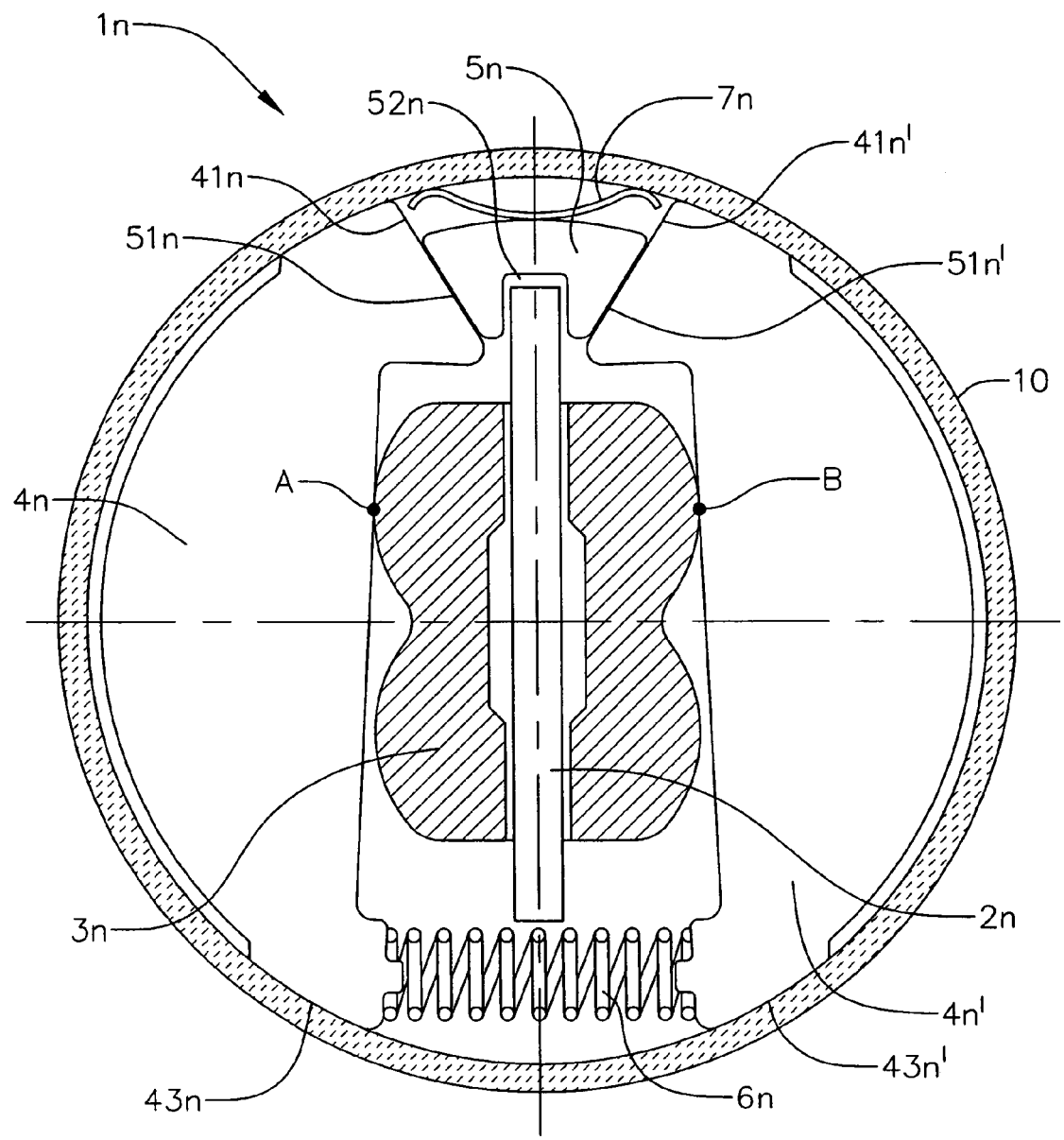
FIG. 18 shows a load torque lock as in FIG. 17 with a rod-like drive element which is pushed through a bore of the output element and onto the end of which is pushed a wedge of a play compensating device.

For this purpose FIGS. 8 to 16 show embodiments for load torque locks with locking elements mounted in two planes for each of the two torsion directions of the displacement device, while FIGS. 17 and 18 show embodiments for load torque locks with locking elements mounted in one plane for each of the two turning directions of the displacement device.

Figure 8:
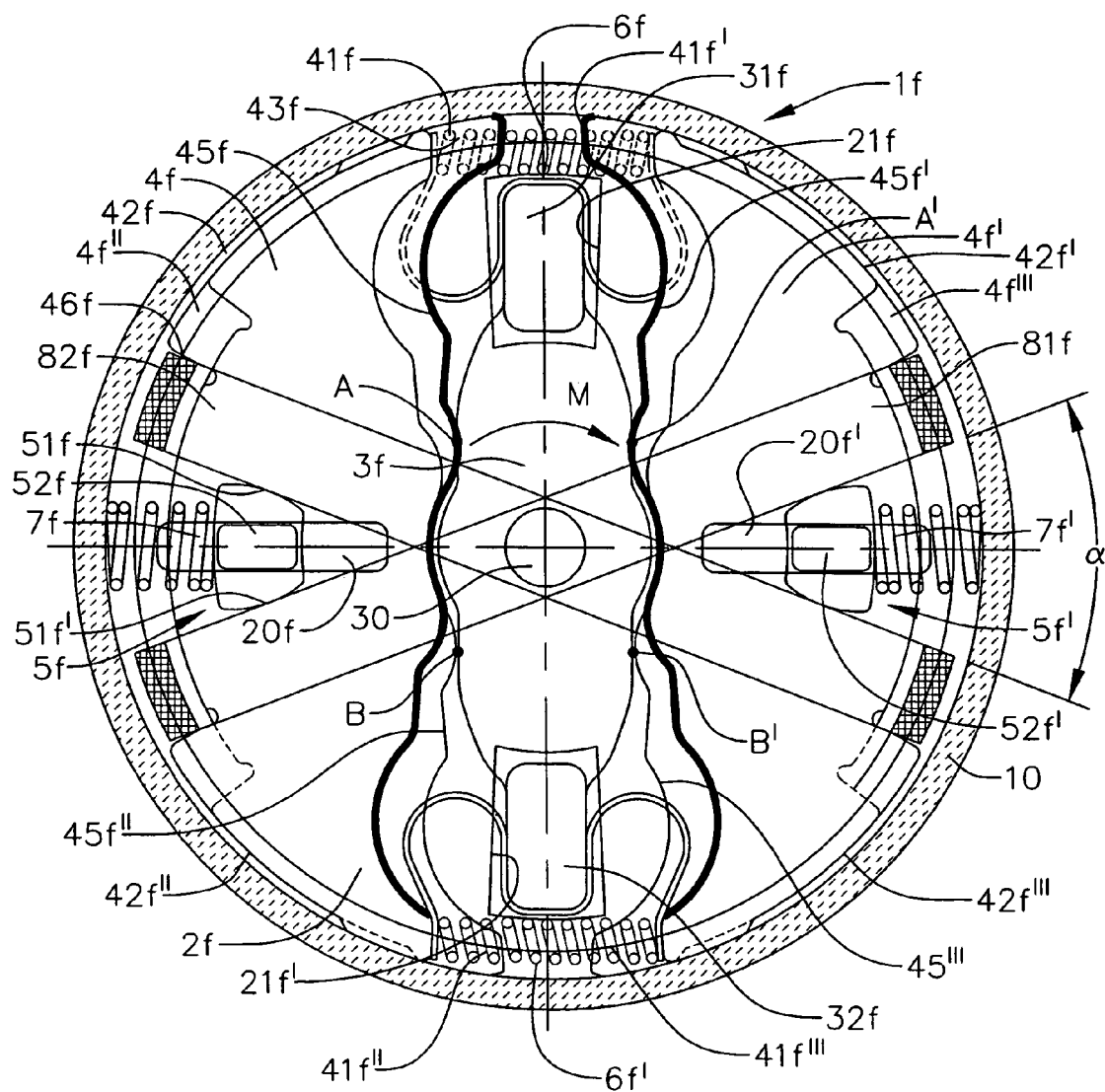
FIG. 8 shows a cross-sectional view through a load torque lock with wedges guided in the drive element for adjusting brake elements.

The part of a displacement device shown in FIG. 8 having automatic compensation of the functionally conditioned torsion angle play has on the drive side a follower disc 2f which is mounted rotatable inside a displacement housing 10 and is connected to a drive lever (not shown) which can swivel in one or other rotary direction and engenders a corresponding rotary movement of the follower disc 2f in one or other rotary direction. The follower disc 2f has diametrically opposite window-shaped openings 21f, 21f' in which claws 31f, 32f project from an output element 3f which is rotatable about a rotary axis of the output axle 30 and to which torque is transferred which is exerted on the follower disc 2f.

The load torque lock 1f contains in two superposed planes two pairs of segment type locking elements 4f, 4f' and 4f'', 4f''', between whose opposing chord faces 45f, 45f' and 45'', 45''' is mounted the output element 3f. The output element 3f and the locking elements 4f, 4f', and 4f'', 4f''' thereby contact one another when torque is introduced on the output side at points A, B' and B, A' dependent on the rotary direction of the output element 3f.

The claws 31f, 32f on one side and the expanding faces 41f, 41f' and 41f'', 41f''' of the locking elements 4f, 4f' and 4f'', 4f''' are adjoined in each plane of the locking elements 4f, 4f' and 4f'', 4f''' by locking element springs 6f, 6f' which consist of a W-spring and a compression spring mounted to reinforce the W-spring at the ends adjoining the expanding faces 41f, 41f' and 41f'', 41f''' of the locking elements 4f, 4f' and 4f'', 4f'''. The springs 6f, 6f' cause the locking elements 4*f*, 4*f'* and 4*f"*, 4*f'"* to adjoin both the output element 3*f* and also with their clamping faces 43*f*, 43*f'* and 43*f"*, 43*f'"* which are part of the peripheral faces 42*f*, 42*f'* and 42*f"*, 42*f'"* of the locking elements 4*f*, 4*f'* and 4*f"*, 4*f'"* with larger diameter, the displacement housing 10.

The angled ends of two scissor arms 81*f*, 82*f* are mounted in peripheral recesses of the locking elements 4*f*, 4*f'* and 4*f"*, 4*f'"* and each radially adjoin radial stops 46*f* (of which only the radial stop of the one locking element 4*f* was marked) of the locking elements 4*f*, 4*f'* and 4*f"*, 4*f'"* in the two planes. This contact bearing is caused by wedges 5*f*, 5*f'* which are guided in diametrically arranged slit-like slide guides 20*f*, 20*f'* of the follow disc 2*f* by means of wedge guides 52*f*, 52*f'* and adjoin with their wedge faces 51*f*, 51*f'* on both sides the side contact bearing faces of the scissor arms 81*f*, 82*f*.

Springs 7*f*, 7*f'* between the displacement housing 10 and the end faces of the wedges 5*f*, 5*f'* facing the displacement housing 10 press the wedges 5*f*, 5*f'* in the direction of the output axis 30 and thus cause the scissor arms 81*f*, 82*f* to spread apart so that these adjoin with their angled ends against the radial stops 46*f* of the locking elements 4*f*, 4*f'* and 4*f"*, 4*f'"*. For this purpose the springs 7*f*, 7*f'* are formed only strong enough so that they spread the scissor arms 81*f*, 82*f* apart so that their angled ends bear against the radial stops 46*f* of the locking elements 4*f*, 4*f'* and 4*f"*, 4*f'"* but not so the locking elements 4*f*, 4*f'* and 4*f"*, 4*f'"* can turn against the action of the locking element springs 6*f*, 6*f'*.

The slide guides 20*f*, 20*f'* of the follower disc 2*f* for housing the wedge guides 52*f*, 52*f'* have a rough or ribbed surface so that a self-locking bearing of the wedges 5*f*, 5*f'* in the slide guides 20*f*, 20*f'*, of the follow disc 2*f* is ensured. On the other hand the contact bearing of the wedges 5*f*, 5*f'* on the side contact bearing faces of the scissor arms 81*f*, 82*f* has no self-locking action, i.e. when the scissor arms 81*f*, 82*f* are compressed in the direction of the wedges 5*f*, 5*f'* the wedges 5*f*, 5*f'* would be pressed outwards, i.e. in the direction of the displacement housing 10. The wedge faces 51*f*, 51*f'* or the side contact bearing faces of the scissor arms 81*f*, 82*f* are preferably provided with a ball-shaped surface in order to produce a linear contact between the contact bearing faces of the scissor arms 81*f*, 82*f* and the wedge faces 51*f*, 51*f'* of the wedges 5*f*, 5*f'*.

The wedge angle α—as already explained in connection with FIGS. 1 to 4—is measured so that the wedges 5*f*, 5*f'* are not moved outwards when loaded, i.e. towards the displacement housing 10.

In the rest state the locking elements 4*f*, 4*f'* and 4*f"*, 4*f'"* are pressed apart under the action of the locking element springs 6*f*, 6*f'* in each plane of the locking elements 4*f*, 4*f'* and 4*f"*, 4*f'"* and turned in the displacement housing 10 so far in the circumferential direction or circular until they adjoin both with their clamping faces 43*f*, 43*f'* and 43*f"*, 43*f'"* against the displacement housing 10 and against the points A and B or A' and B' respectively on the output element 3*f*. If torque is exerted on the follower disc 2*f* against the output torque M recorded by the curved arrow, then the follower disc 2*f* presses through the slide guides 20*f*, 20*f'* the wedge guides 52*f*, 52*f'* and the wedge faces 51*f* against the scissor arm 81*f* which turns the locking elements 4*f* and 4*f'"* unloaded on the output side in the drive direction before the drive torque acts through the window-shaped recesses 21*f*, 21*f'* in the follower disc 2*f* on the claws 31*f*, 31*f'* of the output element 3*f* and causes a corresponding rotary movement of the output element 3*f*.

If drive torque is exerted on the follower disc 2*f* in the direction of the output torque M then the other scissor arm 82*f* is loaded through the wedges 5*f*, 5*f'* and turns the locking elements 4*f'* and 4*f"* tensioned by the output torque.

If as a result of torque on the output side the locking elements 4*f*, 4*f'* and 4*f"*, 4*f'"* are loaded by the output element 3*f*, then the radial stops 46*f* of the locking elements 4*f*, 4*f'* and 4*f"*, 4*f'"* are moved up to each other and displace the scissor arms 81*f*, 82*f* relative to each other accordingly. Since this movement must not be impeded by the wedges 5*f*, 5*f'* the wedge angle α must be so great that the wedges 5*f*, 5*f'* can move outwards without self locking.

Figure 9:
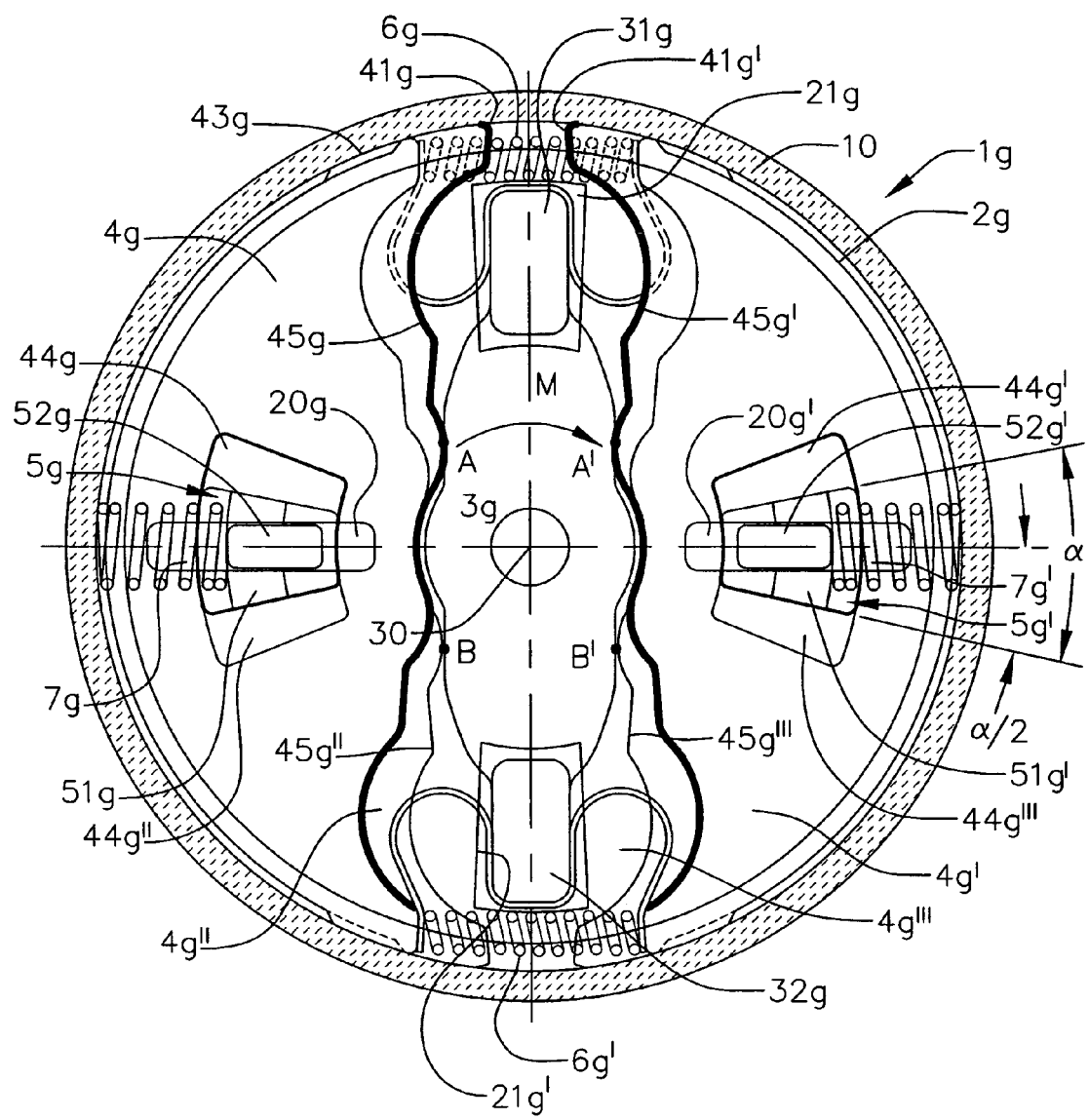
FIG. 9 shows a cross-sectional view through a load torque lock with wedges guided in the drive element and with scissor arms for adjusting locking elements.

One embodiment with automatic play adjustment between a drive element 2*g*, an output element 3*g* and a load torque lock 1*g* without scissor arms is shown in FIG. 9 in which the same function parts are marked with the same reference numerals as in FIG. 8 so that for the description and explanation of the function of these parts reference is made to the illustration of FIG. 8.

In this embodiment the locking elements 4*g*, 4*g'* and 4*g"*, 4*g'"* of two superposed pairs of locking elements have window-shaped recesses 44 (of which only the recess of the one locking element 4*g* was marked) in which wedges 5*g*, 5*g'* are mounted and adjoin with their wedge faces 51*g*, 51*g'* against the one or other side face of the recesses 44 of the superposed locking elements 4*g*, 4*g'* and 4*g"*, 4*g'"*. The wedges 5*g*, 5*g'* which are likewise guided in slide guides 20*g*, 20*g'* of the follower disc 2*g* by means of wedge guides 52*g*, 52*g'* press with their wedge faces 51*g*, 51*g'* directly against the locking elements 4*g*, 4*g'* and 4*g"*, 4*g'"* and thus cause an automatic play compensation as a result of tolerances and wear through the high surface pressure while simultaneously observing the torsion angle play which is required for functioning.

Figure 10:
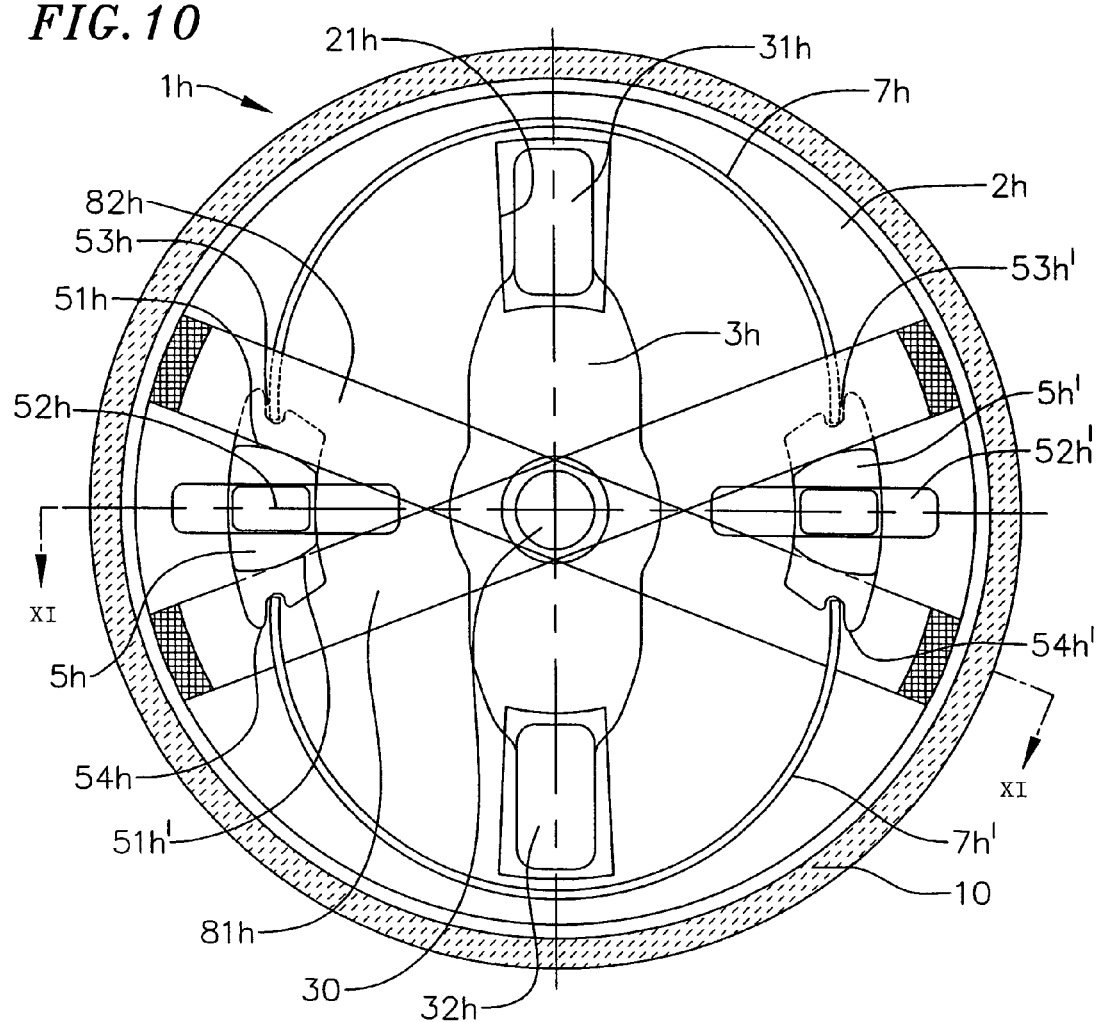
FIG. 10 shows a plan view.
Figure 11:
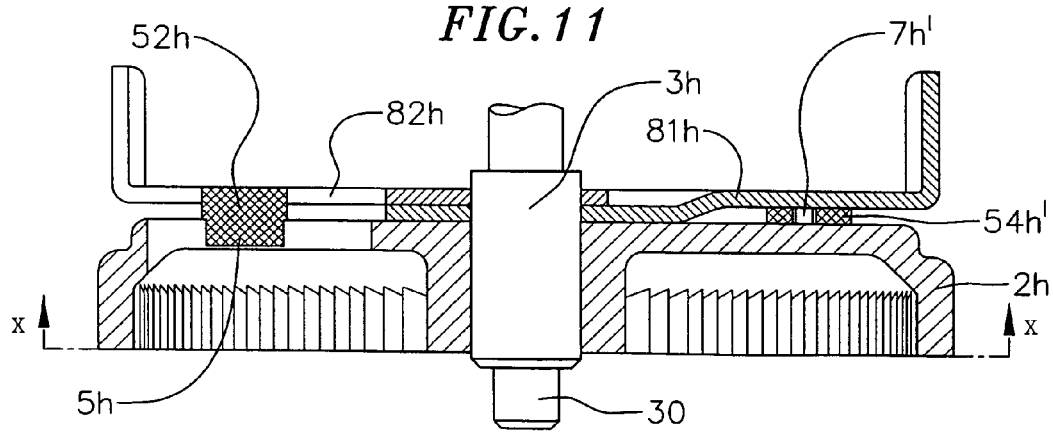
FIG. 11 shows a longitudinal sectional view through a load torque lock with wedges guided in the drive element and wire springs connecting these together as pretensioning elements.

FIG. 10 shows a plan view and FIG. 11 a longitudinal sectional view along the line XI—XI of FIG. 10 through a load torque lock 1*h* which corresponds to the load torque lock 1*f* according to FIG. 8.

In this arrangement instead of the springs 7*f*, 7*f'* which are provided in FIG. 8 between the displacement housing 10 and the end sides of the wedges 5*h*, 5*h'* facing the displacement housing two wire springs 7*h*, 7*h'* are provided whose ends are supported in recesses 53*h*, 53*h'* and 54*h*, 54*h'* of the wedges 5*h*, 5*h'*. The ends of the wire springs 7*h*, 7*h'* adjoin with force locking engagement against the walls, nearer the output axis 30, of the recesses 53*h*, 53*h'* and 54*h*, 54*h'* of the wedges 5*h*, 5*h'* guided with wedge guides 52*h*, 52*h'* in slide guides of the follower disc 2*h* and cause a slight pretensioning of the wedges 5*h*, 5*h'* in the direction of the output axis 30 so that the scissor arms 81*h*, 82*h* are pressed apart analogous with the arrangement and description according to FIG. 8 and their angled ends are brought to bear against the radial stops of the locking elements (not shown in further detail here).

Figure 12:
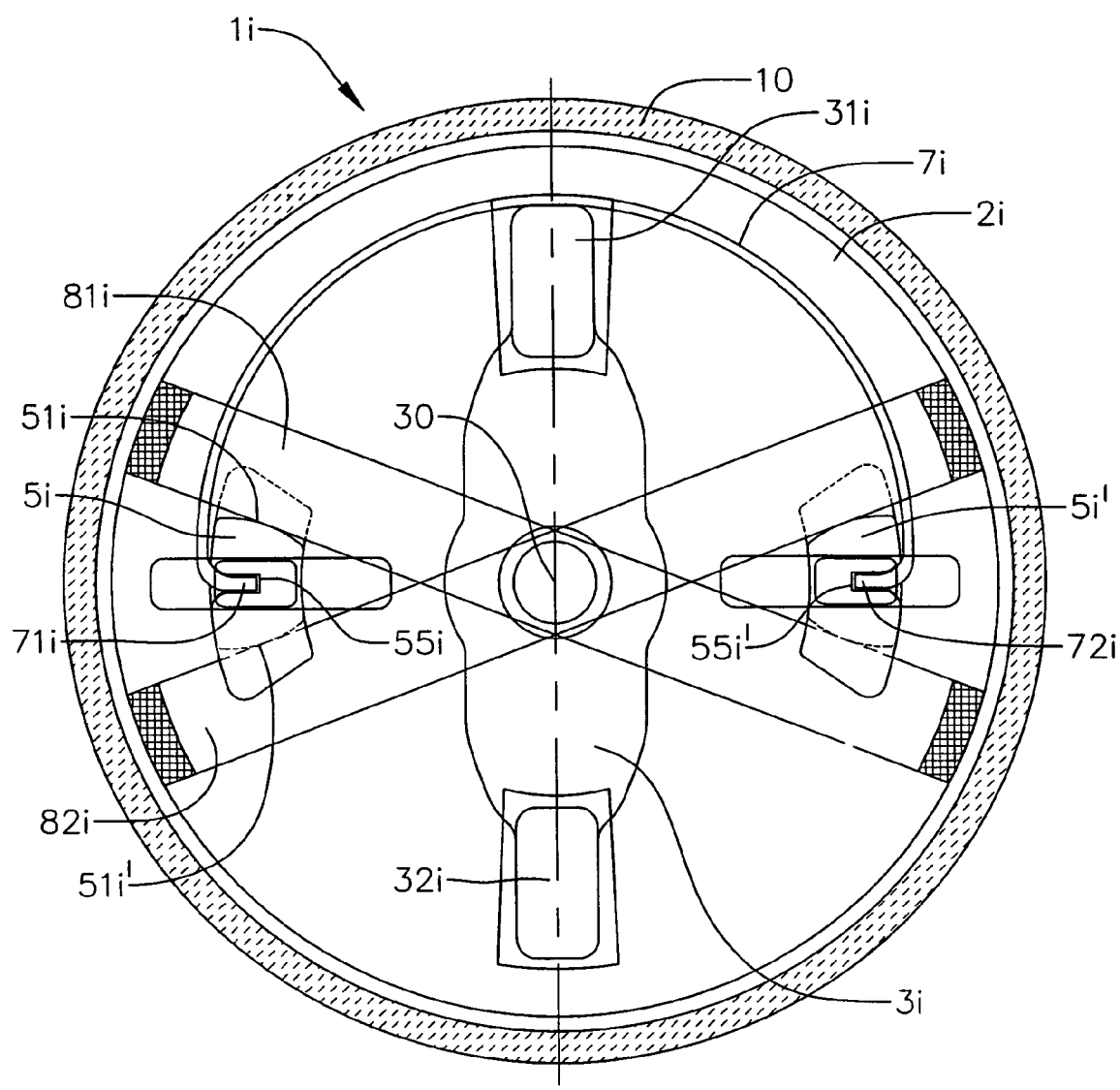
FIG. 12 shows a load torque lock according to FIGS. 10 and 11 with a yoke or formed spring between the wedges adjusting the locking elements.

An alternative load torque lock 1*i* to the load torque lock 1*h* according to FIGS. 10 and 11 is shown in FIG. 12 and has instead of two wire springs for pretensioning the wedges 5*i*, 5*i'* a yoke or formed spring 7*i* whose angled ends 71*i*, 72*i* are mounted in recesses 55*i*, 55*i'* of the wedges 5*i*, 5*i'* and cause the wedge faces of the wedges 5*i*, 5*i'* to bear against the scissor arms 81*i*, 82*i* accordingly to compensate play. Also in this illustration of this embodiment elements having the same construction and same function are provided with the same reference numerals as with the embodiments already illustrated.

Two further variations for an automatic play compensation between a drive element, an output element and a load torque lock with pairs of locking elements mounted one above the other in two planes are shown in FIGS. 13 to 16 each with the minimum and maximum play and with internal and external wedges.

The load torque lock 1k according to FIGS. 13 and 14 has analogous with the embodiments already described two locking elements 4k, 4k' and 4k", 4k'" mounted in a displacement housing 10 in superposed planes of the load torque lock 1k as well as a drive element (not shown in further detail) whose slide guides 20k, 20k' are connected in positive locking engagement with the wedge guides 52k, 52k' of two wedges 5k, 5k', and an output element 3k which is rotatable about an output axis of the output axle 30.

The wedges 5k, 5k' are mounted between opposite expanding faces 41k to 41k'" of the locking elements 4k, 4k' and 4k", 4k'" of each plane wherein the expanding faces 41k to 41k'" open towards the displacement housing 10 and the wedge faces 51k, 51k' adapted to the opening of the expanding faces 41k to 41k'" extend out towards the displacement housing 10 so that the wedges 5k, 5k' are mounted "on the outside". The opening angles of the expanding faces 41k, 41k' and 41k", 41k'" and of the wedge faces 51k, 51k' are thereby different from each other so that a linear bearing contact is provided between the expanding faces 41k, 41k' and 41k", 41k'" and the wedge faces 51k, 51k'.

The locking elements 4k, 4k' and 4k", 4k'" of each plane are pressed apart by locking element springs 6k, 6k' mounted in recesses of the locking elements 4k, 4k' so that—as previously described—the expanding faces 41k, 41k' and 41k", 41k'" adjoin the wedge faces 51k, 51k' and the clamping faces 43k, 43k' and 43k", 43k'" adjoin the displacement housing 10.

Through the action of two wire, yoke or formed springs 7k, 7k' the wedges 5k, 5k' are pretensioned in the direction of the displacement housing 10 so that with maximum play the position of the wedges 5k, 5k' shown in FIG. 13 is produced while minimum play is characterised by the position of the wedges 5k, 5k' shown in FIG. 14.

Figure 15:
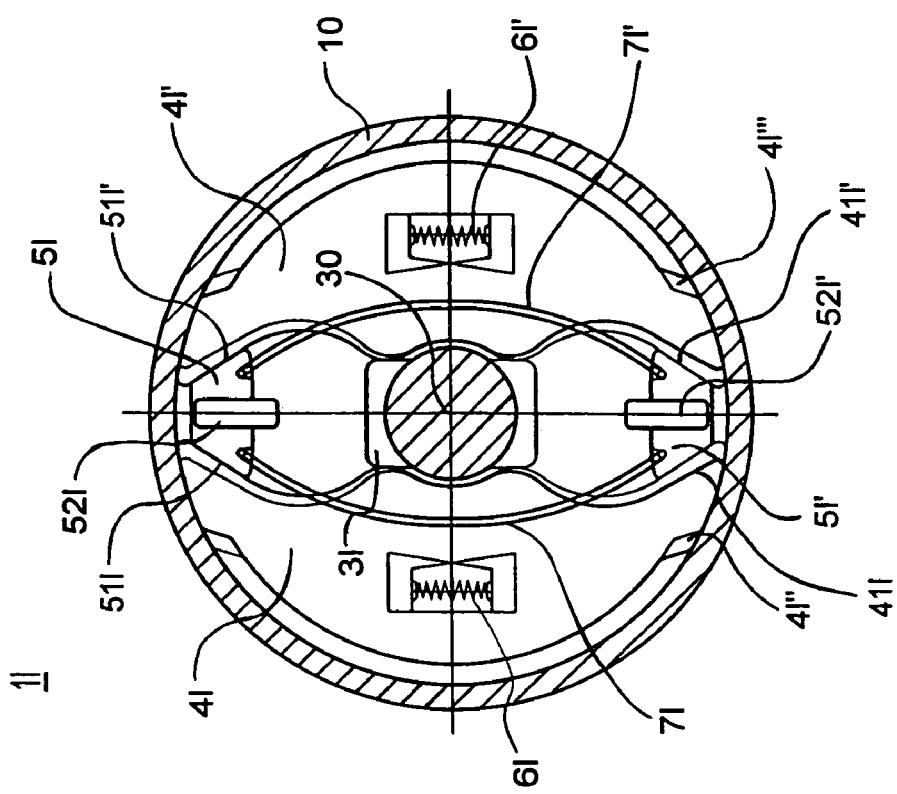

The load torque lock 1l according to FIGS. 15 and 16 has analogous with the embodiment previously described two locking elements 4l, 4l' and 4l", 4l'" mounted in a displacement housing 10 in superposed planes of the load torque lock 1l as well as a drive element (not shown in further detail) whose slide guides 20l, 20l' are connected with positive locking engagement with the wedge guides 52l, 52l' of two wedges 5l, 5l', and an output element 31 rotatable about an output axis of the output axle 30.

The wedges 5l, 5l' are mounted between the opposing expanding faces 41l to 41l'" of the locking elements 4l, 4l' and 4l", 4l'" of each plane wherein the expanding faces 41l to 41l'" close towards the displacement housing 10 so that the wedges 5l, 5l' are arranged "on the inside", i.e. are enclosed by the expanding faces 41l, 41l' and 41l", 41l'" of the brake elements 4l, 4l' and 4l", 4l'". The locking elements 4l, 4l' and 4l", 4l'" of each plane are pressed apart by locking element springs 6l, 6l' mounted in recesses of the locking elements 4l, 4l' and 4l", 4l'" so that—as previously described—the expanding faces 41l, 41l' and 41l", 41l'" bear against the wedge faces 51l, 51l' and the clamping faces 43l, 43l' and 43l", 43l'" bear against the displacement housing 10.

The opening angles of the expanding faces 41l, 41l' and 41l", 41l'" and of the wedge faces 51l, 51l' are also here different from each other so that a linear contact is produced between the expanding faces 41l, 41l' and 41l", 41l'" and the wedge faces 51l, 51l'.

The wedges 5l, 5l' are pretensioned in the direction of the displacement housing 10 under the effect of two wire, yoke or form springs 7l, 7l' so that with maximum play the position of the wedges 5l, 5l' shown in FIG. 15 is produced while minimum play is characterised by the position of the wedges 5l, 5l' shown in FIG. 16.

Further variations for compensating play between a drive element, an output element and a load torque lock with pairs of locking elements mounted one above the other in two planes are shown diagrammatically in FIGS. 17 and 18.

The part of a displacement device shown in FIG. 17 having a load torque lock 1m has analogous with the embodiments illustrated previously, two pairs of locking elements 4m, 4m' mounted in a displacement housing 10 in superposed planes of the load torque lock 1m as well as a rod-like drive element 2m and an output element 3m which encloses the rod-like drive element 2m with play.

A locking element spring 6m is mounted at one end of the locking elements 4m, 4m' between opposing expanding faces 41m, 41m' of the locking elements 4m, 4m' of each plane and brings both the clamping faces 43m, 43m' of the locking elements 4m, 4m' to bear against the displacement housing 10 and also through rotation of the locking elements 4m, 4m' in the displacement housing 10 to bear against the contact bearing points A, B of the output element 3m. The clamping faces 43m, 43m, thereby adjoin the displacement housing 10 and through rotation of the locking elements 4m, 4m' in the circumferential direction adjoin the stop points A and B on the output element 3m.

A wedge 5m is provided as a play compensating device and with its wedge faces 51m, 51m' tapering towards the displacement housing 10 adjoins the expanding faces 43m, 43m' of the locking elements 4m, 4m' and is pushed through a bore 52m to guide the wedge 5m on to the rod-like drive element 2m and is guided through same. A spring 7m is mounted between the end face of the wedge 5m remote from the displacement housing 10 and the end face of the output element 3m facing this said end face, the spring 7m pretensioning the wedge 5m in the direction of the expanding faces 51m, 51m' and thus as a result of the configuration of the facing expanding faces 41m, 41m' of the locking element 4m, 4m' as well as of the wedge faces 51m, 51m' of the wedge 5m causes the locking elements 4m, 4m' to slide apart in parallel and bear radially in each plane against the displacement housing 10.

The wedge faces 51m, 51m' of the wedge 5m thus adjoin the expanding faces 41m, 41m' of the locking elements 4m, 4m' so that no self-locking action is produced between the locking elements 4m, 4m' and the wedge 5m. The wedge 5m is pressed back against the spring 7m under the effect of the locking element springs 6m and the resulting rotation of the locking elements 4m, 4m' in the displacement housing 10.

If a drive torque is exerted on the drive element 2m against the output torque then this drive torque is first transferred to the wedge 5m since sufficient play is provided between the drive element 2m and the output element 3m. The wedge 5m is pressed with self-locking action by the drive element 2m against the locking elements 4m, 4m' and lifts the clamping faces 43m, 43m' of the locking elements 4m, 4m' slightly away from their bearing against the displacement housing 10 so that the friction contact is eliminated or reduced and the drive element 2m as a result of overcoming the play between the drive element 2m and output element 3m comes to bear against the inner faces of the output element 3m. The drive torque is thereby transferred directly to the output element 3m in the rotary direction of the drive torque.

If however torque is exerted on the output element 3m then the output element 3m transfers, as a result of its bearing contact against points A and B on the locking elements 4m, 4m', the torque to the locking elements 4m, 4m' whereby the bearing contact of the clamping faces 43m, 43m' against the displacement housing 10 is intensified and thus torque transfer from the output element 3m to the drive element 2m is blocked.

FIG. 18 shows an arrangement which is substantially similar to the embodiment according to FIG. 17. As opposed to the embodiment according to FIG. 17 however with the load torque lock 1n according to FIG. 18 the wedge 5n is provided with a recess 52n into which an end of the drive element 2n engages and thereby guides the wedge 5n, and the wedge faces 51n, 51n' thereby expand towards the displacement housing 10 and adjoin expanding faces 41n, 41n' of the locking elements 4n, 4n' which open correspondingly towards the displacement housing, i.e. the distance between the expanding faces 41n, 41n' of the locking elements 4n, 4n' increases towards the displacement housing 10. The expanding faces 41n, 41n' are adjoined by the wedge faces 51n, 51n' of the wedge 5n under the action of a weak spring 7n which is mounted between the displacement housing 10 and the end face of the wedge 5n facing the displacement housing 10.

Analogous with the arrangement according to FIG. 17 the wedge faces 51n, 51n' of the wedge 5n thus adjoin the expanding faces 41n, 41n' of the locking elements 4n, 4n' so that no self locking action is produced between the locking elements 4n, 4n' and the wedge 7n. The wedge 5n is pressed back against the spring 7n under the action of the locking element spring 6n with the resulting rotation of the locking elements 4n, 4n' in the displacement housing 10.

If a drive torque is exerted against the output torque onto the drive element 2n then this drive torque is first transferred to the wedge 5n since sufficient play is provided between the drive element 2n and the output element 3n. The wedge 5n is pressed with self locking action by the drive element 2n against the locking elements 4n, 4n' and lifts the clamping faces 43n, 43n' of the locking elements 4n, 4n' slightly away from their bearing contact against the displacement housing 10 so that the friction connection is lifted or reduced and the drive element 2n as a result of overcoming the play between the drive element 2n and the output element 3n comes to bear against the inside faces of the output element 3n whereby the drive torque is transferred directly to the output element 3n in the rotary direction of the drive torque.

If however torque is exerted on the output element 3n then the output element 3n as a result of the contact bearing of the output element 3n and locking elements 4n, 4n' against the points A and B transfers the torque to the locking elements 4n, 4n' whose clamping faces 43n, 43n' intensify their contact bearing against the displacement housing 10 so that torque transfer from the output element 3n to the drive element 2n is blocked.

All the displacement devices described above have the common basic function according to which with drive torque acting in the direction of the output torque the lock caused by the locking element is lifted but remains latently active so that an immediate locking takes place when the drive torque is lifted. If however the drive torque acts against the output torque then the lock is lifted and the drive torque is introduced into the output. A slight lifting or circular rotation of the locking element thereby takes place and then an immediate renewed bearing contact against the displacement housing.

The invention claimed is:

1. A displacement device for producing a rotary movement, comprising:
   a drive element;
   an output element which can be adjusted in angle by the drive element;
   a load torque lock which is mounted between the drive element and the output element and which blocks torque introduced from the output element on an output side through force-locking engagement and transfers torque introduced from the drive element on a drive side to the output element, wherein the load torque lock includes rigid locking elements;
   a play compensating device which compensates a torsion angle play between the drive element, the output element and the load torque lock, wherein the play compensating device is located at least one of between the drive element and the load torque lock and between the output element and the load torque lock; and
   at least two locking elements with expanding faces;
   wherein the drive element has a wedge slide guide;
   wherein the play compensating device has at least one wedge with wedge faces and a wedge guide, the wedge mounted between the expanding faces of the at least two locking elements with the wedge faces set opposite the expanding faces of the locking elements and guided displaceable with the wedge guide in positive locking engagement in the wedge slide guide of the drive element and pretensioned radially by means of a spring so that the wedge faces adjoin the expanding faces free of play;
   wherein a matching of materials of the expanding faces and the wedge faces on one side and active faces of the wedge guide and wedge slide guide of the drive element on the other side is such that in the absence of any drive torque the expanding faces can move the wedge against the action of the spring and that in the event of strain on the drive side the wedge is held in position; and
   wherein $\alpha$ is the wedge angle which the wedge faces include between themselves, $\sigma_{sperr,min}$ is the minimum friction angle, $\sigma_{sperr,max}$ is the maximum friction angle between the wedge faces and the expanding faces, $\sigma_{antr,min}$ is the minimum friction angle between the wedge guide and the wedge slide guide and the following conditions are met $$2*\sigma_{sperr,max} < \alpha$$

$$\sigma_{antr,min} + \sigma_{sperr,min} > \alpha/2$$

in which $\sigma$=arc tan $\mu$ and $\mu$ is the friction value between the friction faces formed from expanding faces and the wedge faces in the case of $\sigma_{sperr,max}$ and $\sigma_{sperr,min}$ and the active faces of the wedge guide and wedge slide guide in the case of $\sigma_{antr,min}$.

2. The displacement device according to claim 1, wherein: the locking elements are mounted in a cylindrical displacement housing, the at least two locking elements each having clamping faces which adjoin the displacement housing under the effect of the play compensating device, such that torque introduced by the output element intensifies the bearing contact of the locking elements against the displacement housing.

3. The displacement device according to claim 2 wherein the expanding faces are opposing expanding faces, and the play compensating device is mounted at least in part between the opposing expanding faces and presses the locking elements apart with such force that the clamping faces of the locking elements adjoin the displacement housing with predetermined pretension.

4. The displacement device according to claim 2 or 3 wherein:
   the play compensating device is guided in the drive element and is connected to a spring which pretensions the play compensating device in a play compensating direction.

5. The displacement device according to claim 2 wherein:

the at least two locking elements are biased with a pretensioning force against a play compensating direction.

6. The displacement device according to claim 2 wherein:

the drive element has recesses which adjoin with keyed connection against claws of the output element and entrain the output element in the drive direction in the event of torque on the drive side after lifting friction-locking contact of the locking elements against the displacement housing.

* * * * *